US012134896B2

(12) United States Patent
Gisler (10) Patent No.: US 12,134,896 B2
(45) Date of Patent: Nov. 5, 2024

(54) HOLDING MEANS FOR A SOLAR ROOF TILE

(71) Applicant: Markus Gisler, Niederbipp (CH)

(72) Inventor: Markus Gisler, Niederbipp (CH)

(73) Assignee: MEGASOL ENERGIE AG, Deitingen (CH)

( * ) Notice: Subject to any disclaimer, the term of this patent is extended or adjusted under 35 U.S.C. 154(b) by 0 days.

(21) Appl. No.: 17/791,618

(22) PCT Filed: Jan. 11, 2021

(86) PCT No.: PCT/EP2021/050406
§ 371 (c)(1),
(2) Date: Jul. 8, 2022

(87) PCT Pub. No.: WO2021/140252
PCT Pub. Date: Jul. 15, 2021

(65) Prior Publication Data
US 2023/0039474 A1 Feb. 9, 2023

(30) Foreign Application Priority Data

Jan. 10, 2020 (CH) ................................. 00026/20
Jan. 13, 2020 (CH) ................................. 00033/20
May 6, 2020 (CH) ................................. 00540/20

(51) Int. Cl.
*E04D 1/30* (2006.01)
*H02S 20/25* (2014.01)

(52) U.S. Cl.
CPC ............... *E04D 1/30* (2013.01); *H02S 20/25* (2014.12)

(58) Field of Classification Search
CPC ............... E04D 1/30; E04D 2001/304; E04D 2001/305; E04D 2001/306;
(Continued)

(56) References Cited

U.S. PATENT DOCUMENTS 10,505,495 B2 12/2019 Almy et al.
2018/0351501 A1* 12/2018 Seery .................... H01L 31/048
(Continued)

FOREIGN PATENT DOCUMENTS

JP H10317603 A 12/1998

OTHER PUBLICATIONS

European Patent Office, Notification of Transmittal of the International Search Report and the Written Opinion of the International Searching Authority, or the Declaration—for PCT/EP2021/050406, dated Apr. 6, 2021, 11 pp., The Netherlands.
(Continued)

*Primary Examiner* — Babajide A Demuren
(74) *Attorney, Agent, or Firm* — Amster, Rothstein & Ebenstein LLP (57) ABSTRACT

A holding means for a solar roof tile includes an oblong beam extending in a longitudinal direction, a first support supported in a mounted position on a first upper batten of a pitched roof, and a second support supported in the mounted position on a second lower batten. The holding means further includes at least one rest for the solar roof tile and a drain channel arranged adjacent to the at least one rest and extending in the longitudinal direction to drain atmospheric water along a longitudinal outer edge of the solar roof tile.

19 Claims, 7 Drawing Sheets

(58) Field of Classification Search
CPC ........ E04D 2001/307; E04D 2001/308; E04D 2001/309; E04D 2001/301; E04D 2001/302; E04D 2001/303; H02S 20/25
See application file for complete search history.

(56) References Cited

U.S. PATENT DOCUMENTS

| | | | | |
|---|---|---|---|---|
| 2019/0273463 | A1* | 9/2019 | Seery | .................. E04D 1/34 |
| 2020/0399902 | A1* | 12/2020 | Xie | .................. F24S 25/613 |
| 2023/0047945 | A1* | 2/2023 | Prasad H S | .......... E04D 1/3402 |

OTHER PUBLICATIONS

Extended European Search report issued Jun. 6, 2024 in connection with EP 24163438.5-1002.

* cited by examiner

HOLDING MEANS FOR A SOLAR ROOF TILE

CROSS-REFERENCE TO RELATED APPLICATIONS

This application is a U.S. national stage entry under 35 U.S.C. § 371 of PCT International Patent Application No. PCT/EP2021/050406, filed Jan. 11, 2021, which claims priority to Switzerland Patent Application No. 00026/20, filed Jan. 10, 2020, Switzerland Patent Application No. 00033/20, filed Jan. 13, 2020, and Switzerland Patent Application No. 00540/20, filed May 6, 2020. The contents of each of the above-identified applications are incorporated herein by reference in their entirety.

FIELD OF THE INVENTION

The present invention is generally directed towards holding means for roof tiles on pitched roofs and more particularly for solar roof tiles on pitched roofs.

BACKGROUND OF THE INVENTION

When building a new property with a pitched roof or when refurbishing an existing pitched roof, selecting "in roof" solar roof tiles is a preferred choice as they are aesthetically pleasing. The solar roof tiles serve in this case a dual purpose, acting as roof covering and as generators of electricity at the same time. Usually, the solar roof tiles are mounted to horizontal battens of the pitched roof with special holding means, which secure the solar roof tile, while providing in combination with the solar roof tile a protection against water ingress and a drainage of atmospheric water.

From the prior art holding means for solar roof tiles are known.

EP2784241A1 published in October 2014 in the name of Swisspearl Group AG relates to a roof covering, which is composed of lower and upper side lateral joint profiles that are mounted and fastened one above other in flow direction on an underground. A water basin is arranged horizontally parallel to the underground for collecting water and/or a seal provided between overlapping portions of lower plate and upper plate is arranged horizontally to the underground. A lower side of lower and upper plates is held together by using panel fastener. The lower and upper plates are overlapped so that falling edges of plates are overlapped with joint profiles.

WO12120208A2 published September 2012 in the name of Centurywatt relates to a cover for a slanted roof panel, comprising: a frame that runs along the inclination of the roof; and a plurality of photovoltaic panels that are arranged in vertical rows along the inclination of the roof and partially overlap, the lower edge of a top panel covering the upper edge of a bottom panel in a row. The invention is characterized in that the upper edges of the photovoltaic panels have joints which extend the panels substantially on the same plane and seal the cover, said joints not being in direct contact with the entire width of the panels that overlap the joints. The invention particularly applies to standard laminated or double-glass photovoltaic solar panels.

SUMMARY OF THE INVENTION

In a preferred variation is directed to a holding means for a solar roof tile comprising an oblong beam extending in longitudinal direction x and comprising a first support supported in a mounted position on a first upper batten of a pitched roof. The oblong beam is further supported in the mounted position on a second lower batten by a second support. In order to hold at least one solar roof tile, the holding means further comprises at least one rest for the solar roof tile. The rest may in some variations hold two or more horizontally neighboring solar roof tiles. For the holding means to serve as a protection against water ingress, a drain channel is arranged adjacent to the at least one rest and extending in the longitudinal direction x to drain atmospheric water along a longitudinal outer edge of the solar roof tile.

Usually the first and the second support each comprise at least one first bearing area supporting the oblong beam with respect to the first upper and the second lower batten in general perpendicular to its extension in the longitudinal direction x. Alternatively or in addition, the first and/or the second support may comprise at least one second bearing area supporting the oblong beam with respect to the first upper and the second lower batten in the longitudinal direction x.

Depending on the field of application the first and/or the second support may comprise at least one connection means arranged in the respective first and/or the respective second bearing area to fasten the first and/or the second support to the respective first upper and/or the respective second lower batten. The connection means may at least one out of the following: screws, bolts, nails, pins, glue, slings, etc. The holding means can be fastened to various types of battens, like bend metal battens, however preferred are conventional wooden battens.

In a preferred variation, perpendicular to the general extension x of the oblong beam the first bearing area of the first support is spaced a first distance apart d1 apart from the rest and the first bearing area of the second support is spaced a second distance d2 apart from the rest, wherein the second distance d2 is greater than the first distance d1. This has the advantage, that the solar roof tile is arranged in the mounted position at its lower end inclined with respect to a plane defined by the first upper and the second lower batten. Preferably the first bearing area is spaced a third distance d3 apart from an upper end of the oblong beam in the mounted position and the second bearing area is spaced a fourth distance d4 apart from a lower end of the oblong beam in the mounted position, wherein the fourth distance d4 is greater than the third distance d3. This has the further advantage that the oblong beam comprises an overhang section, which extends in the mounted position of the holding means in the longitudinal direction x beyond the second lower batten. A holding means having the aforementioned construction allow rows of roof tiles, in particular solar roof tiles and/or (regular) roof tiles, to imbricate in the overhang section of the oblong beam.

Good results can be achieved, when at least the second support is securely fastened to the respective second lower batten, while the first support rests on the first upper batten. In the case that wind engages at the lower end of the holding means, the holding means transfers the lifting force in a rocker-like manner into a pressure on the first upper batten.

In a preferred variation the oblong beam has at least in one area a C-shaped or U-shaped cross-section perpendicular to the longitudinal direction x. To achieve a good weight to strength ratio, the oblong beam is preferably made at least partially from stamped and bend sheet metal and/or injection molded plastic material. These shapes and materials are advantageous as they allow for a light and rigid oblong beam.

Depending on the design the rest can be interconnected to the oblong beam and/or a solar roof tile as a separate part. Preferably the rest is at least partially made from an elastic material. The possible materials for the rest comprise foam and rubber materials. In some variations the rest can be formed as a rubber mat. This mat may be glued to the oblong beam.

A material saving construction can be achieved, when the drain channel is incorporated in the rest and/or the oblong beam. Preferably a multiplicity of drain channels is incorporated into the rest, thereby providing a labyrinth sealing with the thereupon resting solar roof tile.

The holing means may comprise at least one securing element for securing the solar roof tile in the mounted position in the longitudinal direction x. This securing element is preferably formed as a hook attached to the oblong beam. However other types of securing elements are possible, like eyelets and/or bolts and/or clamps and/or glue etc. In some variations the surface of the hooks may be at least partially be covered with an elastic material in order to protect the solar roof tile. Additionally, the solar roof tile may be secured by the overhang section of an upward arranged holding means.

Preferably a spacer is arranged between the overhang section and the solar roof tile, which at least partially consists of an elastic material in order to limit a possible displacement of the solar roof tile towards the overhand section.

Good results are possible when the spacer additionally acts as a sealing therebetween.

Superior results can be achieved when the spacer does not act as a sealing but as a water reflux stopper to retain water flowing back due to wind while providing at least one air gap, such that air can flow in between overhanging roof tiles. This is advantageous as a cooling of the solar roof tile increases its efficiency when generating electricity. In some variations two or more water reflux stoppers can be arranged in the overhang section.

In order prevent damage to the solar roof tile, the holding means preferably further comprises a rib extending in the mounted position adjacent to the drain channel between two neighboring solar roof tiles. This is advantageous, especially in the case of two solar roof tiles being arranged horizontally next to each other, which rest with their neighboring respective longitudinal outer edges on the rest of the therebetween arranged holding means. The rib, preferably made from an elastic material, protects the solar roof tiles from damaging one another. In a preferred variation the rib may be integrally formed with the rest, however the rib may be arranged between two neighboring solar roof tiles as a separate part. In this situation of two neighboring solar roof tiles each partially arranged on a common rest of the holding means arranged between the solar roof tiles, the holding means additionally acts as a protection against the ingress of atmospheric water.

Another aspect of the disclosure is a solar roof tile for covering a pitched roof and for being mounted to the battens of the pitched roof by means of the holding means described above.

In one variation the solar roof tile comprises a strip-like sealing element extending parallel to at least a longitudinal outer edge or a horizontal outer edge of the solar roof tile. A water tight sealing can be achieved, when the sealing element is arranged adjacent to the horizontal outer edge in an area shaded by an overhang section of the above neighboring solar roof tile on a face of the solar roof tile, which is in the mounted position facing the sun. The solar roof tile has preferably no solar cells in the area covered by the strip-like sealing element and/or the area on the face of the solar roof tile shaded by the overhang section of the holding means located above.

In a preferred variation the solar tile comprises water reflux stopper extending parallel to at least a horizontal outer edge of the solar roof tile. In the mounted position of the solar roof tile the water reflux stopper provides an air gap between a lower and an upper solar roof tile, such that air can flow in between the upper and lower solar roof tile. Air circulation can cool the solar roof tiles and therefore increase the efficiency of the solar roof tiles. Herein the amount of water to potentially enter the roof is minimized while providing air circulation to cool the solar roof tiles. The water reflux stopper has preferably a L-shaped or a triangle-shaped cross section. In some variations the water reflux stopper mechanically connects a lower solar roof tile to the overhang section of a holding means mounted above, such that a displacement of the solar roof tile towards the overhand section of the holing means mounted above is limited. However, the water reflux stopper does generally not connect two adjacent solar roof tiles, since it provides the air gap for air circulation.

Advantageously the water reflux stopper is attached to a face of the solar roof tile adjacent to the horizontal outer edge of the solar roof tile. However, depending on the design the water reflux stopper can also be attached to the horizontal outer edge of the solar roof tile. Usually the water reflux stopper protrudes from the solar roof tile to form a barrier for retaining water flowing into the roof while providing the air gap for air circulation. The water reflux stopper may be attached to the solar roof tile by means of clamping or by means of at least one out of the following: adhesives, screws, nails, bolts. Clamps etc.

A further aspect of the disclosure is a solar roofing kit for a pitched roof comprising at least two holing means and at least one solar roof tile each as described above, wherein the two holding means are mounted to and supported by the battens of the pitched roof. Preferably the solar roofing kit comprises further necessary sealing elements to provide a water tight roof.

Another aspect of the disclosure is directed to a solar roof comprising at least one solar roof tile as described before supported by battens via at least two thereto mounted holding means as described before. In the case that both, (regular) roof tiles and solar roof tiles are incorporated into the solar roof, the solar roof tiles and the (regular) roof tiles have preferably a similar height in the longitudinal direction x. This leads to an aesthetically more pleasing result.

In a preferred variation the rest of the holding means may be configured to hold a (regular) roof tile on a first rest area of the rest and a solar roof tile on an adjacent second rest area, such that the (regular) roof tile interlocks with the first rest area. The first rest area and the (regular) roof tile preferably interlock in a water sealing manner.

A further advantage of the above described holding means and solar roof tiles is that the roof tiles roof tiles of a non-solar roof can be replaced by solar roof tiles in combination with the holding means without any changes to a roof support structure of the roof, in particular the arrangement and type of battens. This is especially advantageous when refurbishing a preexisting roof.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
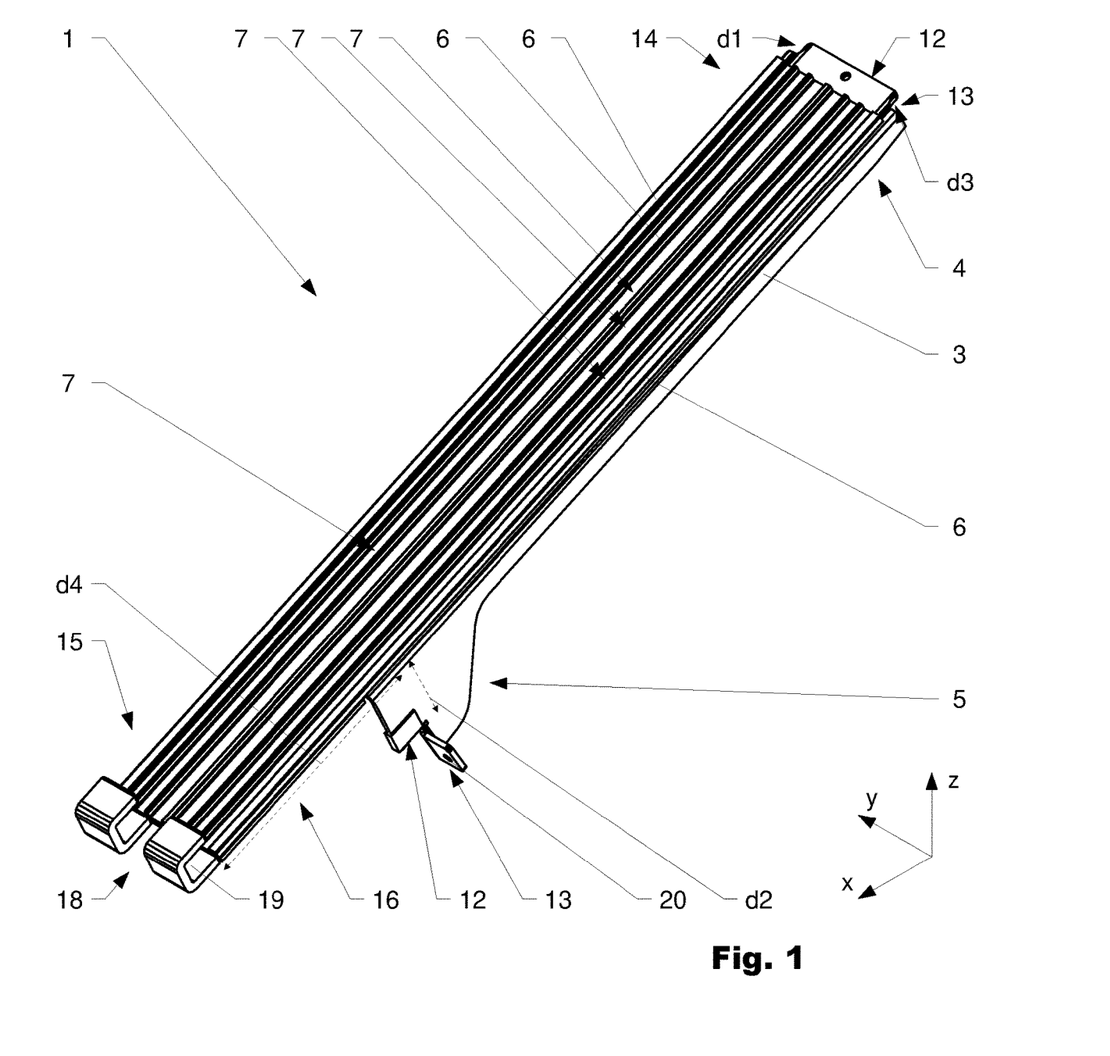
FIG. 1 a perspective view of a variation of the holding means according to the disclosure.
Figure 2:
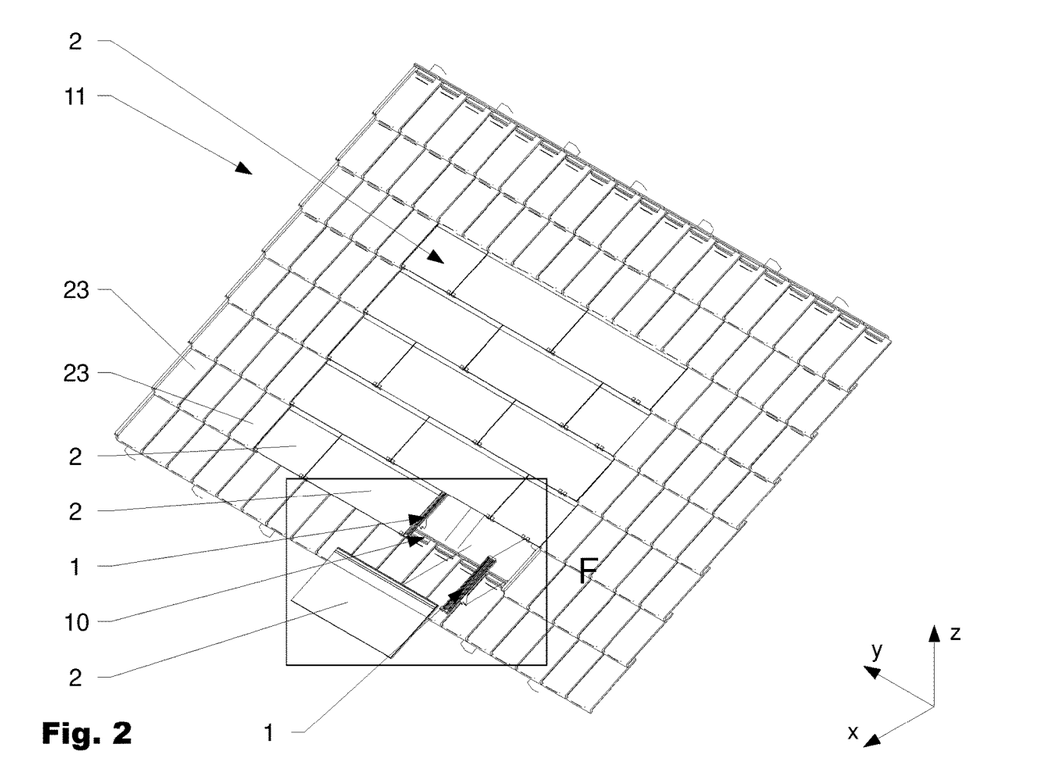
FIG. 2 a pitched roof with solar roof tiles and holding means in a perspective and partially exploded view.
Figure 3:
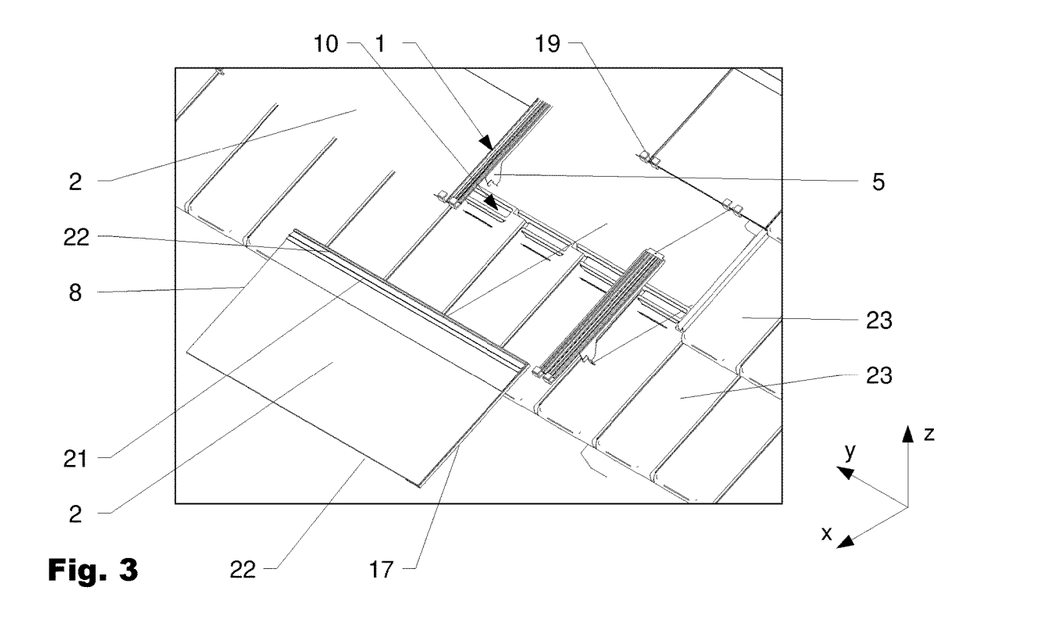
FIG. 3 a detailed view of the pitched roof of FIG. 2 indicated by the box with label F.
Figure 4:
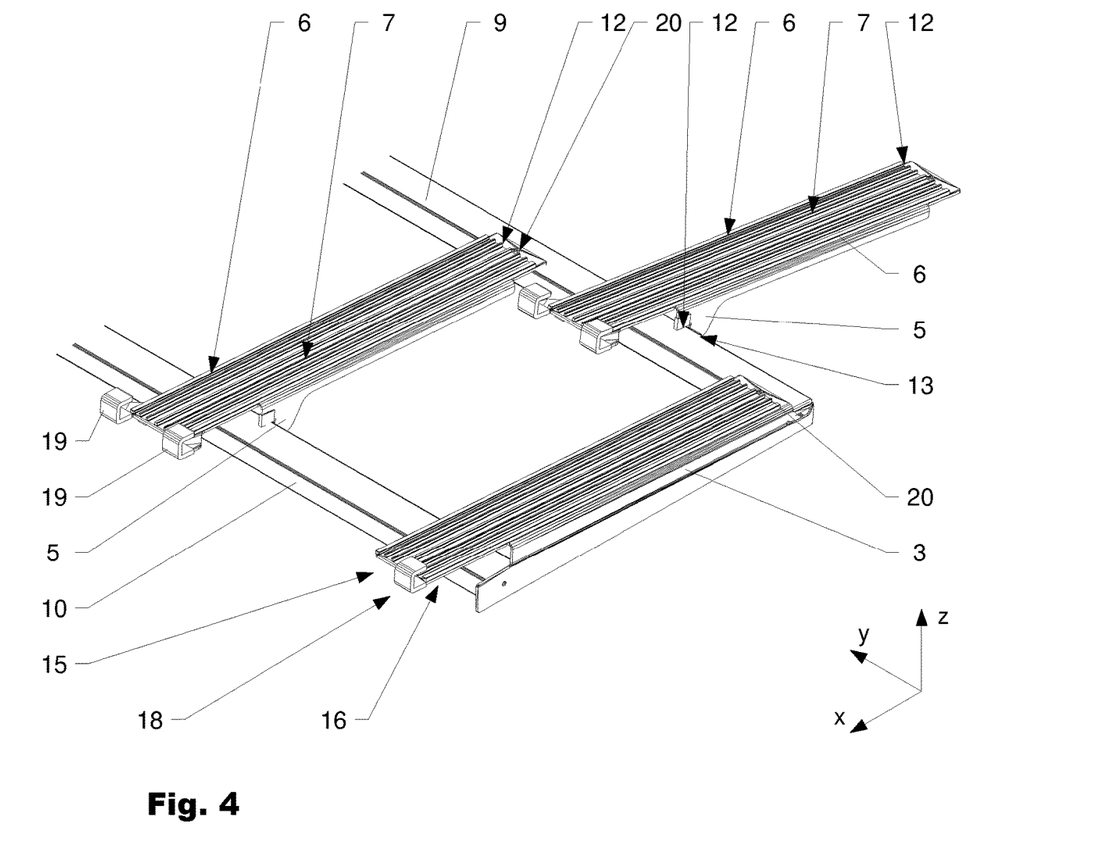
FIG. 4 a perspective view of roof battens and a second and third variation of the holding means according to the disclosure.
Figure 5:
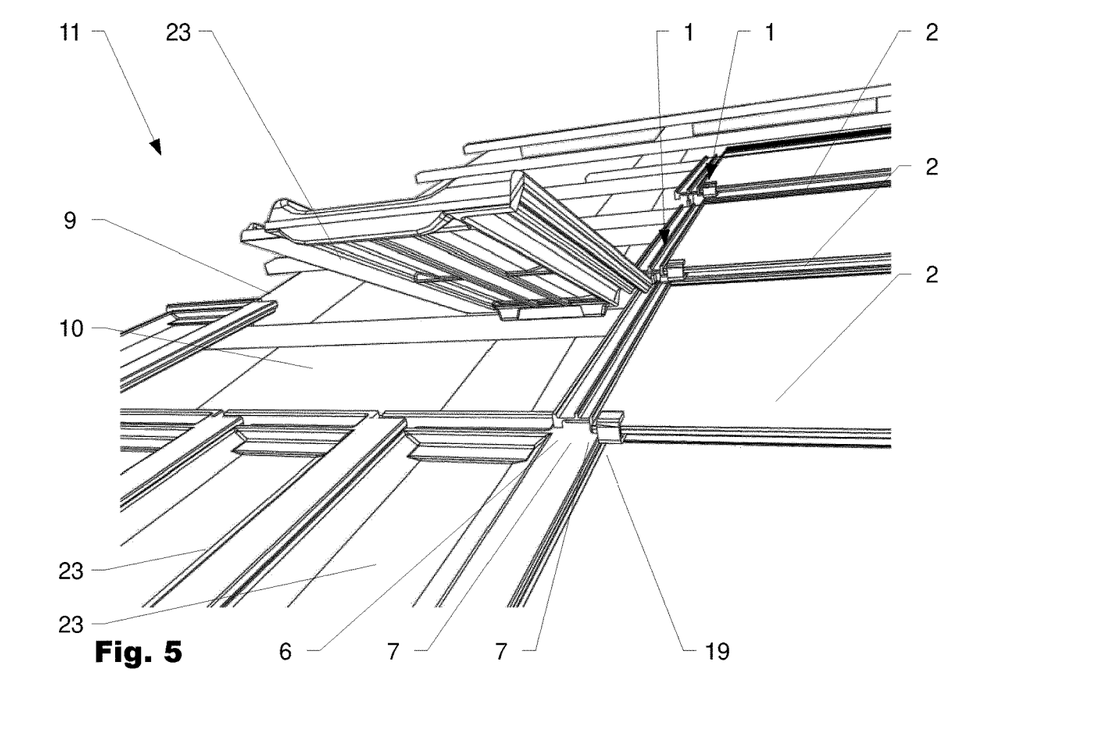
FIG. 5 a perspective view on a pitched roof with neighboring regular and solar roof tiles.
Figure 6:
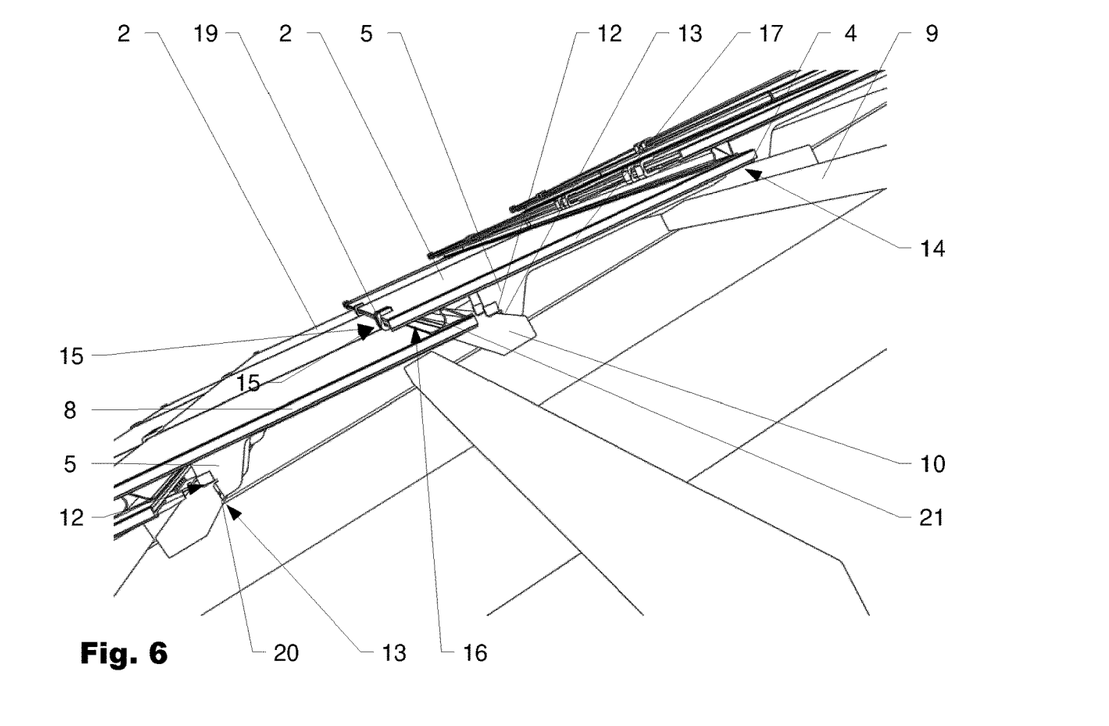
FIG. 6 a perspective view on a pitched roof.
Figure 7:
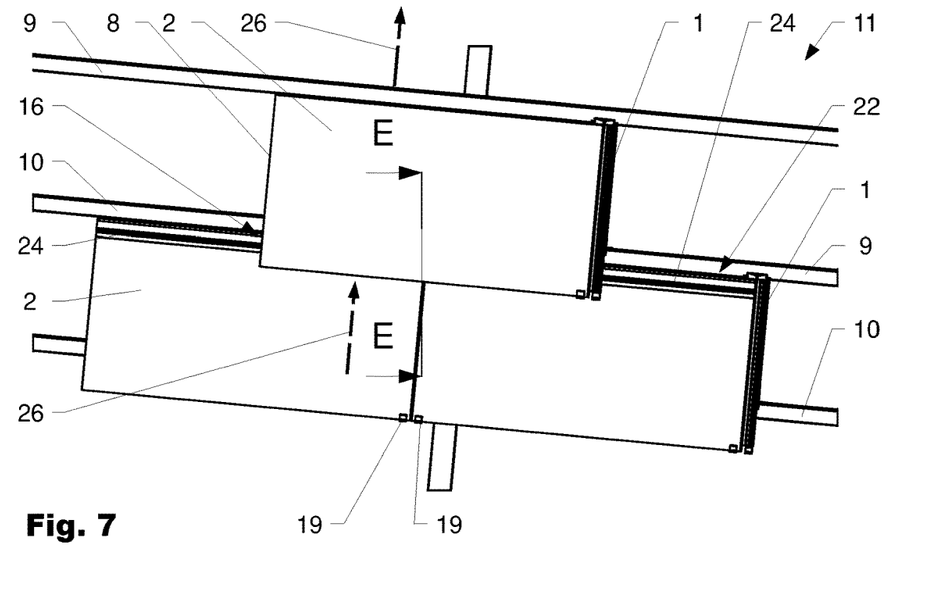
FIG. 7 a top down view of a partial pitched roof.
Figure 8:
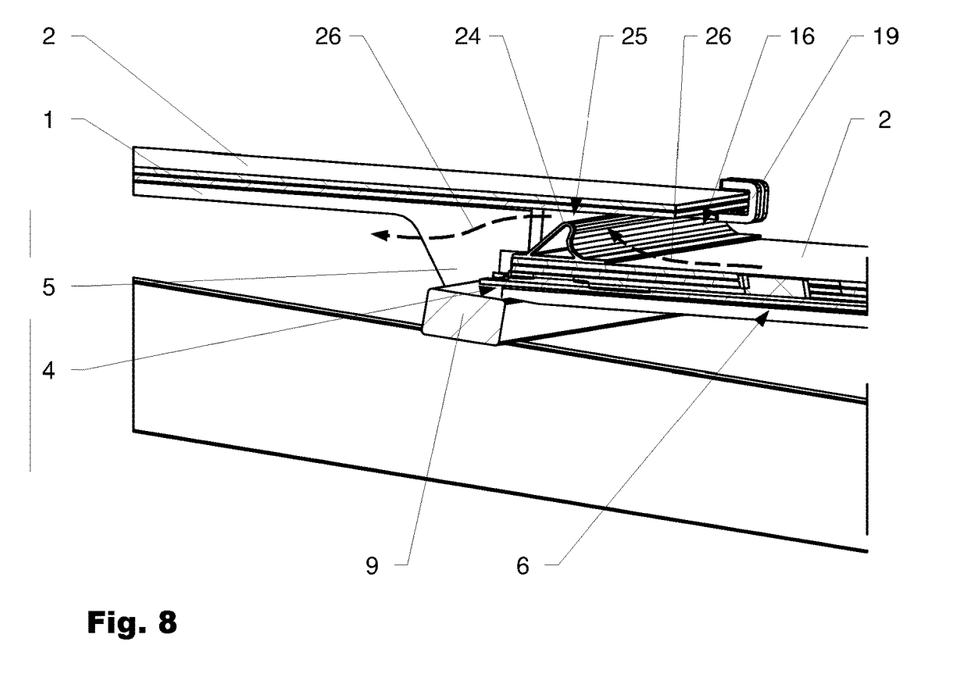
FIG. 8 a section view of the pitched roof of FIG. 7 indicated by the section line EE.
Figure 9:
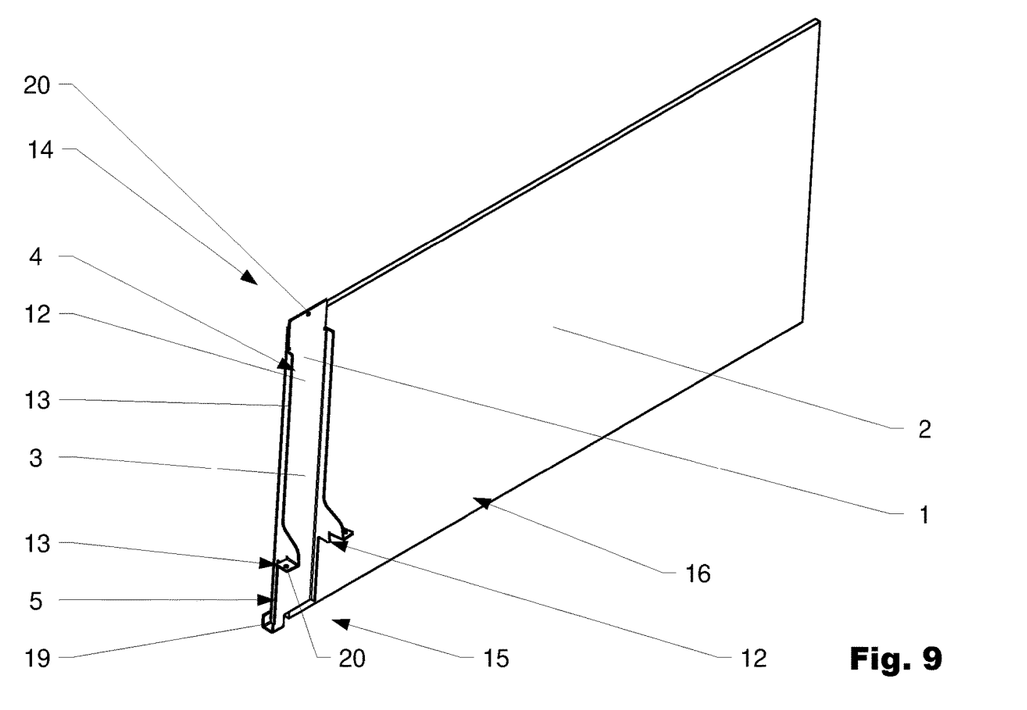
FIG. 9 a fourth variations of a holding means according to the disclosure with a solar roof tile attached.
Figure 10:
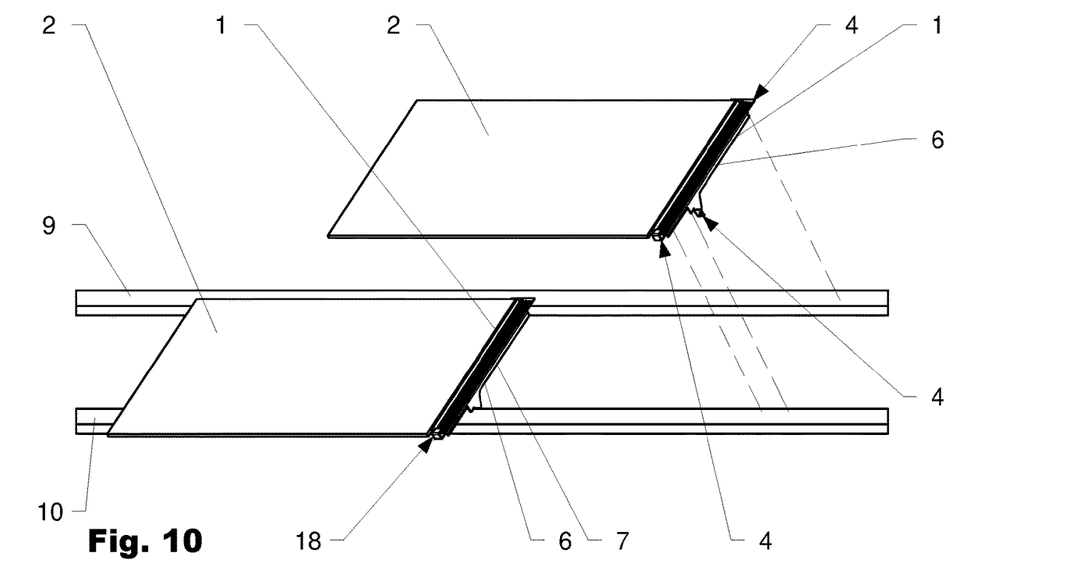
FIG. 10 a perspective view on a pitched roof with two holdings means and solar roof tiles of FIG. 9.

FIG. 1 shows a perspective view of a variation of the holding means 1 according to the disclosure. FIG. 2 shows a pitched roof 11 with solar roof tiles 2 and holding means 1 in a perspective and partially exploded view. The shown roof 11 comprising regular tiles 23 and solar roof tiles 2. FIG. 3 shows a detailed view of the pitched roof 11 of FIG. 2 indicated by the box with label F and FIG. 4 shows a perspective view of roof battens 9, 10 and a second and third variation of the holding means 1 according to the disclosure. FIG. 5 shows a perspective view on a pitched roof 11 with neighboring regular and solar roof tiles 23, 2 and FIG. 6 shows a perspective view on a pitched roof from a lateral point of view. FIG. 7 shows a top down view of a pitched roof in a partially assembled state and FIG. 8 is showing a section view of the pitched roof of FIG. 7 indicated by the section line EE. FIGS. 9 to 12 are showing a fourth and fifth variation of a holding means according to the disclosure.

The holding means 1, as shown in FIGS. 1 to 4 for holding a solar roof tile 2 comprise an oblong beam 3 extending in longitudinal direction x. The oblong beam 3 comprises a first support 4 supported in a mounted position on a first upper batten 9 of a pitched roof 11, as best visible in FIG. 4. The shown variations of the oblong beam 3 is further supported in the mounted position on a second lower batten 10 by a second support 5. The mounted position of the holding means 1 is shown in FIG. 4, whereas the mounted position the holding means 1 holding solar roof tiles 2 is best visible in FIG. 3. In order to hold at least one solar roof tile 2, the holding means 1 further comprises at least one rest 6 for the solar roof tile 2. As can be seen in FIGS. 2 and 3, the rest 6 in some variations holds two horizontally neighboring solar roof tiles 2.

For the holding means 1 to serve as a protection against water ingress, a drain channel 7 is arranged adjacent to the at least one rest 6, as shown in FIG. 1. The drain channel 7 extends in the longitudinal direction x to drain atmospheric water along a longitudinal outer edge 8 of the solar roof tile 2.

The first and the second support 4, 5, as shown in FIG. 1, each comprise at least one first bearing area 12 supporting the oblong beam 3 with respect to the first upper and the second lower batten 9, 10 in general perpendicular to its extension in the longitudinal direction x. In the shown variations, the second support 5 additionally comprises second bearing areas 13 supporting the oblong beam 3 with respect to the first upper and the second lower batten 9, 10 in the longitudinal direction x.

The first and/or the second support 4, 5 each comprise in order to be fixedly connected to the respective batten 9, 10 a connection means is arranged in the respective first and/or the respective second bearing area 12, 13. The connection means, as shown in FIG. 1, comprise in this variation though bores 20 in the respective first and/or the respective second bearing area 12, 13 for screwing and/or nailing each support 4, 5 to the respective batten 9, 10

As shown in FIG. 1, perpendicular to the general extension x of the oblong beam 3 the first bearing area 12 of the first support 4 is spaced a first distance apart d1 apart from the rest 6 and the first bearing area 12 of the second support 5 is spaced a second distance d2 apart from the rest 6, wherein the second distance d2 is greater than the first distance d1. This has the advantage, that the solar roof tile 2 is arranged in the mounted position at its lower end 15 inclined with respect to a plane defined by the first upper and the second lower batten 9, 10, as best visible in FIG. 4. Further shown in FIG. 1, is that the first bearing area 12 is spaced a third distance d3 apart from an upper end 14 of the oblong beam 3 in the mounted position and the second bearing area 13 is spaced a fourth distance d4 apart from a lower end 15 of the oblong beam 3 in the mounted position, wherein the fourth distance d4 is greater than the third distance d3. This has the further advantage that the oblong beam 3 comprises an overhang section 16, which extends in the mounted position of the holding means 1 in the longitudinal direction x beyond the second lower batten 10. A holding means 1 having the aforementioned construction allow rows of roof tiles, in particular solar roof tiles 2, to imbricate in the overhang section 16 of the oblong beam 3, as can be seen in FIGS. 2 and 3.

The shown variations of the oblong beam 3 have a U-shaped cross-section in the area of the second support 5 perpendicular the longitudinal direction x, Furthermore, the oblong beam 3 is made from stamped and bend sheet metal.

The rest 6 as shown in FIGS. 1 and 4 is interconnected to the oblong beam 3 and is formed as a separate part. It is made from an elastic material, more specifically in this case a rubber, forming a rubber mat. This mat 6 is glued to the oblong beam 3. The drain channel 7 is incorporated in the rubber mat, more specifically multiple drain channels 7 are incorporated into the rubber mat 6. These drain channels 7 are arranged adjacent to each other thereby providing a labyrinth sealing with the in the mounted position thereupon resting solar roof tile 2, as best visible in FIG. 3.

The holing means comprises at least one securing element 18 for securing the solar roof tile 2 in the mounted position in the longitudinal direction x. The securing element 18, in the shown variations, is formed as a hook 19 attached to the oblong beam 3 and in the mounted position encloses the lower horizontal outer edge 22 of the solar roof tile 2, as shown in FIG. 3. Furthermore, the solar roof tiles 2 are secured by the overhang section 16 of a holding means 1 and/or roof tiles 23 and/or solar roof tiles 2 arranged above.

A rib 17 extending in the mounted position adjacent to the drain channel 7 is arranged between two neighboring solar roof tiles 2. As visible in FIG. 3, the rib is formed as a separate part and is attached to the longitudinal outer edge 8 of the solar roof tile 2. Furthermore, the rib 17 is made from an elastic material in order to protect the solar roof tiles 2 from damaging one another. In the displayed situation of two neighboring solar roof tiles 2 each partially arranged on a common rest 6 of the holding means 1 arranged between the solar roof tiles 2, the holding means 1 additionally acts as a protection against the ingress of atmospheric water.

Another aspect of the disclosure is a solar roof tile 2 for covering a pitched roof 11 and for being mounted to the battens 9, 10 of the pitched roof 11 by means of the holding means 1 described above. The solar roof tile 2 can be best observed in FIG. 3.

In a first variation the solar roof tile 2 comprises a strip-like sealing element 20, which extends parallel to at least a longitudinal outer edge 8 or a horizontal outer edge 22 of the solar roof tile 2. A water tight sealing is achieved, when the sealing element 20 is arranged adjacent to the horizontal outer edge 22 in an area shaded by an overhang section 16 of the above neighboring solar roof tile 2 on a face of the solar roof tile 2, which is in the mounted position facing the sun. The solar roof tile 2 has no solar cells in the area covered by the strip-like sealing element 20 and/or the area on the face of the solar roof tile 2 shaded by the overhang section 16 of the holding means 1 located above.

In a second variation the solar roof tile 2 comprises a water reflux stopper 24, which extends parallel to at least a longitudinal outer edge 8 of the solar roof tile 2. In the mounted position, as best visible in FIG. 8, the water reflux stopper 24 provides an air gap 25 in the overhang section 16 between the solar roof tile 2 and another solar roof tile 2 mounted directly above. This way a flow of air 26 can flow in between the solar roof tiles 2 in the overhang section 16, while minimizing the amount of water to potentially enter the pitched roof 11. The airflow 26 circulating behind the solar roof tiles 2 transports heat away from the solar roof tiles 2.

In this second variation, as shown in FIG. 7, the water reflux stopper 24 is arranged on a face adjacent to the horizontal outer edge 22 of the solar roof tile 2. In the shown variation the water reflux stopper 24 is a rubber strip with a triangle-shaped cross section connecting the solar roof tile to the lower end 15 of a holding means 1 mounted above.

FIG. 5 shows a regular roof tile 23 being placed with one of its longitudinal outer edges 8 on the rest 6 of fourth variation of a holding means 1 according to the disclosure. The rest 6 and the regular roof tile 23 interconnect in a water sealing manner by a labyrinth-like sealing. The regular roof tile 23 and the solar roof tile 2 have a similar length in the longitudinal direction x. Adjacent to the regular roof tile 23 the rest 6 holds a solar roof tile 2, secured by a hook 19 arranged at the lower end 15 of the oblong beam against sliding in the longitudinal direction x.

FIG. 6 displays a pitched roof 11 having solar roof tiles 2 mounted to its battens 9, 10 via holding means 1 according to the disclosure. It can be seen the solar roof tiles 2 are in addition to the hooks 19 of the holding means 1, further secured by the over hand section 16 of the above located holding means 1. Between the solar roof tile 2 and the above located overhand section 16 a strip-like sealing element 21 is arranged. The sealing element 21 further acts as a spacer between the solar roof tile 2 and the holding means 1 above. As can further be seen the holding means 1 provide an inclined rest 6 for the solar roof tiles 2 with respect to a plane defined by the first upper and the second lower batten 9, 10.

The description above applies in similar advantageous ways to the forth and the fifth variation of the holding means 1, as shown in FIGS. 9 to 12. These variations however differ in that at least one solar roof tile 2 is attached to the holdings means 1. Here one holding means 1 and one solar roof tile 2 preferably form one building block of a pitched roof 11. The connection of the solar roof tile 2 and the holdings means 1 can be done by means of mechanical connection means, however the connection is preferably done by means of adhesives. One advantage of using adhesives is, that a water tight sealing can be achieved, in case the adhesive is applied along the rest 6 and/or the oblong beam 3. The holding means 1 typically comprise at least one securing element 18, in the fourth variation the holding means 1 comprises one hook 19 to secure the neighboring tile supported in the mounted position by the rest 6 of the holding means 1.

Figure 11:
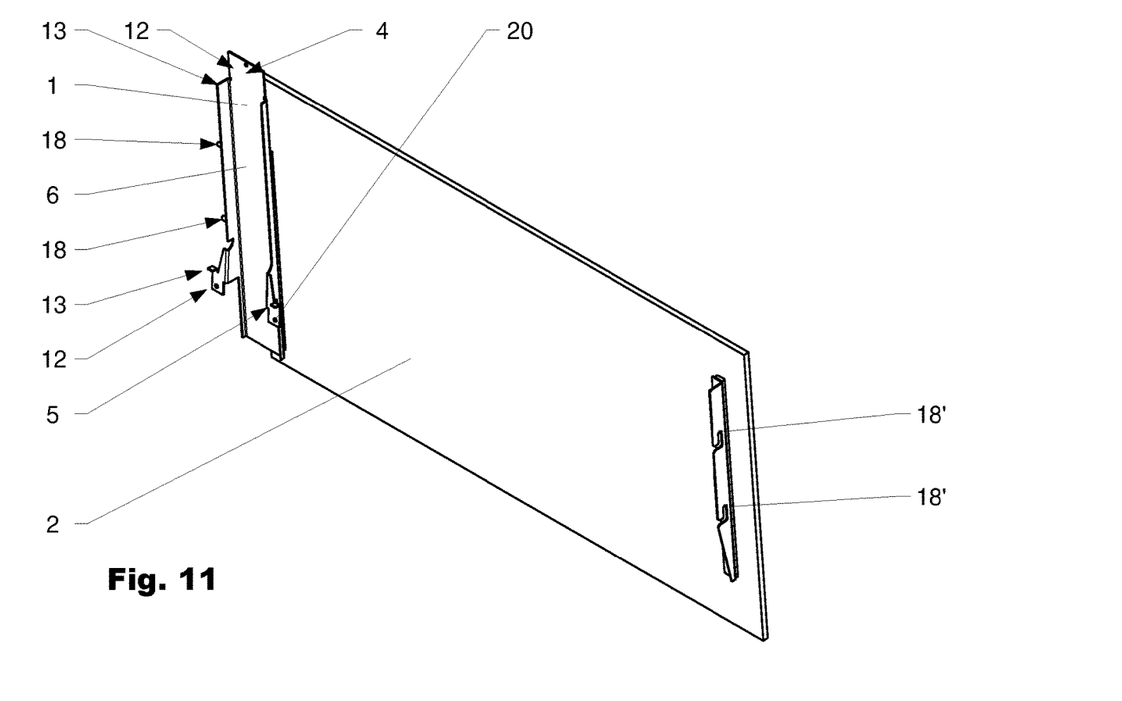
FIG. 11 a fifth variations of a holding means according to the disclosure with a solar roof tile attached.
Figure 12:
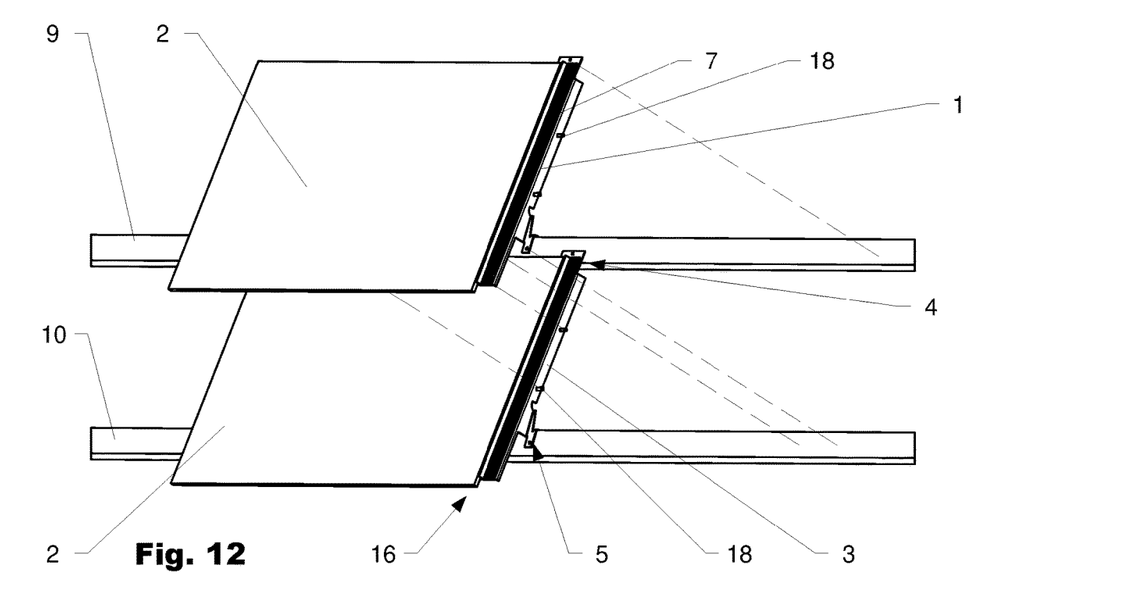
FIG. 12 a perspective view on a pitched roof with two holdings means and solar roof tiles of FIG. 11.

The fifth variation of the holding means 1, as shown in FIGS. 11 and 12 usually comprises two securing elements 18, which interconnect in the mounted state with associated securing elements 18' attached to a face of the solar roof tile. In the fifth variation the securing elements 18 are extending from the oblong beam 3 vertically and essentially perpendicular to the longitudinal direction x. The associated securing elements 18' interlock with the securing elements 18 in the mounted state in a form locking manner. The associated securing elements 18' can be formed as essentially L-shaped receiving cut-outs, the securing elements 18 can be essentially rod-shaped for engaging with the cut-outs. The (associated) securing elements 18' can be arranged in an essentially L-shaped sheet metal attached to a face of the solar roof tile 2, in particular to the face of the solar roof tile 2 facing the battens 9, 10 in the mounted state.

Rather, the words used in the specification are words of description rather than limitation, and it is understood that various changes may be made without departing from the Spirit and scope of the invention.

LIST OF DESIGNATIONS

| | |
|---|---|
| 1 | Holding means |
| 2 | Solar roof tile |
| 3 | Oblong beam |
| 4 | First support |

LIST OF DESIGNATIONS

| | |
|---|---|
| 5 | Second support |
| 6 | Rest |
| 7 | Drain channel |
| 8 | Longitudinal outer edge (solar roof tile) |
| 9 | First upper batten |
| 10 | Second lower batten |
| 11 | Pitched roof |
| 12 | First bearing area |
| 13 | Second bearing area |
| 14 | Upper end (oblong beam) |
| 15 | Lower end (oblong beam) |
| 16 | Overhang section (oblong beam) |
| 17 | Rib |
| 18 | Securing element |
| 19 | Hook |
| 20 | Connection means |
| 21 | Sealing element |
| 22 | Horizontal outer edge (solar roof tile) |
| 23 | Roof tile |
| 24 | Water reflux stopper |
| 25 | Air gap |
| 26 | Air flow |

The invention claimed is:

1. A holder for a solar roof tile, comprising:
   a. an oblong beam extending in a longitudinal direction and comprising a first support supported in a mounted position on a first upper batten of a pitched roof and a second support supported in the mounted position on a second lower batten, wherein the first support and the second support each comprise at least one first bearing area supporting the oblong beam with respect to the first upper batten and the second lower batten in general perpendicular to its extension in the longitudinal direction;
   b. at least one rest for the solar roof tile; and
   c. a drain channel arranged adjacent to the at least one rest and extending in the longitudinal direction to drain atmospheric water along a longitudinal outer edge of the solar roof tile.

2. The holder according to claim 1, wherein the first support and/or the second support comprise at least one second bearing area supporting the oblong beam with respect to the first upper batten and the second lower batten in the longitudinal direction.

3. The holder according to claim 1, wherein perpendicular to the extension of the oblong beam the at least one first bearing area of the first support is spaced a first distance apart from the rest and the at least one first bearing area of the second support is spaced a second distance apart from the rest, wherein the second distance is greater than the first distance, such that the solar roof tile is arranged in the mounted position at its lower end inclined with respect to a plane defined by the first upper batten and the second lower batten.

4. The holder according to claim 2, wherein the at least one first bearing area is spaced a third distance apart from an upper end of the oblong beam in the mounted position and the at least one second bearing area is spaced a fourth distance apart from a lower end of the oblong beam in the mounted position, wherein the fourth distance is greater than the third distance, such that the oblong beam comprises an overhang section, which extends in the mounted position of the holder in the longitudinal direction beyond the second lower batten.

5. The holder according to claim 1, wherein the oblong beam has at least in one area a C-shaped or U-shaped cross-section perpendicular to the longitudinal direction.

6. The holder according to claim 1, further comprising a rib extending in the mounted position adjacent to the drain channel between two neighboring solar roof tiles.

7. The holder according to claim 1, wherein the rest is interconnected to the oblong beam and/or a solar roof tile as a separate part.

8. The holder according to claim 1, wherein the rest is at least partially made from an elastic material.

9. The holder according to claim 1, wherein the drain channel is incorporated in the rest and/or the oblong beam.

10. The holder according to claim 1, wherein the oblong beam is made at least partially from stamped and bent sheet metal and/or injection molded plastic material.

11. The holder according to claim 1, further comprising at least one securing element for securing the solar roof tile in the mounted position in the longitudinal direction.

12. The holder according to claim 11, wherein the securing element is formed as a hook attached to the oblong beam.

13. The holder according to claim 1, wherein the first support and/or the second support comprise at least one connection means arranged in the respective first bearing area and/or the respective second bearing area to fasten the first support and/or the second support to the respective first upper batten and/or the respective second lower batten.

14. A solar roof tile for covering a pitched roof and for being mounted to battens of the pitched roof by a holder of the solar roof tile, wherein the solar roof tile comprises a water reflux stopper extending parallel to at least a horizontal outer edge of the solar roof tile, such that in a mounted position an air gap is provided for air to flow in between two solar roof tiles.

15. The solar roof tile according to claim 14, wherein the water reflux stopper is attached to a face of the solar roof tile adjacent to the horizontal outer edge of the solar roof tile.

16. The solar roof tile according to claim 14, wherein the solar roof tile comprises a strip-like sealing element extending parallel to at least a longitudinal outer edge or a horizontal outer edge of the solar roof tile.

17. The solar roof tile according to claim 14, wherein the sealing element is arranged adjacent to the horizontal outer edge in an area shaded by an overhang section of the above neighboring solar roof tile on a face of the solar roof tile, which is in the mounted position facing the sun.

18. A solar roofing kit for a pitched roof, comprising:
   at least two holders according to claim 1; and
   at least one solar roof tile configured to be mounted to the battens of the pitched roof by the at least two holders of the solar roof tile;
   wherein the at least two holders are mounted to and supported by the battens of the pitched roof.

19. A solar roof, comprising:
   at least one solar roof tile according claim 14 supported by battens via at least two holders mounted to the at least one solar roof tile, wherein each of the at least two holders comprises:
   a. an oblong beam extending in a longitudinal direction and comprising a first support supported in a mounted position on a first upper batten of a pitched roof and a second support supported in the mounted position on a second lower batten;
   b. at least one rest for the solar roof tile; and
   c. a drain channel arranged adjacent to the at least one rest and extending in the longitudinal direction to drain atmospheric water along a longitudinal outer edge of the solar roof tile.

* * * * *